United States Patent
Singarajan et al.

(10) Patent No.: US 7,795,838 B2
(45) Date of Patent: Sep. 14, 2010

(54) USER INTERFACE SYSTEM AND METHOD FOR JUMP ASSIST OF HYBRID VEHICLES

(75) Inventors: Kumar Singarajan, Rochester Hills, MI (US); Berlinda Bai, Troy, MI (US); Shweta Kumar, Troy, MI (US); Gunnar Urbschat, Troy, MI (US)

(73) Assignees: Chrysler Group LLC, Auburn Hills, MI (US); Daimler AG, Stuttgart (DE)

(*) Notice: Subject to any disclaimer, the term of this patent is extended or adjusted under 35 U.S.C. 154(b) by 497 days.

(21) Appl. No.: 11/930,416

(22) Filed: Oct. 31, 2007

(65) Prior Publication Data

US 2009/0108803 A1  Apr. 30, 2009

(51) Int. Cl.
*H01M 10/46* (2006.01)
(52) U.S. Cl. .................................... 320/104
(58) Field of Classification Search ............... 320/104, 320/107, 114, 132, 149; 180/65.1, 65.21, 180/65.26, 65.28, 65.29; 701/22
See application file for complete search history.

(56) References Cited

U.S. PATENT DOCUMENTS

| | | | |
|---|---|---|---|
| 5,343,970 A * | 9/1994 | Severinsky | 180/65.25 |
| 6,701,880 B1 | 3/2004 | Gauthier et al. | |
| 6,841,972 B2 | 1/2005 | Koo | |
| 2001/0048226 A1* | 12/2001 | Nada | 290/40 C |
| 2002/0063002 A1* | 5/2002 | Lasson | 180/65.3 |
| 2003/0230443 A1* | 12/2003 | Cramer et al. | 180/65.5 |
| 2004/0041403 A1 | 3/2004 | Fattic | |
| 2005/0279542 A1* | 12/2005 | Maslov et al. | 180/65.2 |
| 2007/0113814 A1 | 5/2007 | Tamai et al. | |

* cited by examiner

*Primary Examiner*—Edward Tso
(74) *Attorney, Agent, or Firm*—Ralph E. Smith (57) ABSTRACT

The present disclosure is a system and method for charging a high voltage battery of a hybrid automotive vehicle which contemporaneously provides a user with a visual display of diagnostic hybrid system information, including but not limited to, battery data and state of charge data through a user interface located internal a cabin of the vehicle. In other exemplary embodiments, the user interface is operable for providing the visual display while also providing access to other features of the vehicle to the user.

20 Claims, 6 Drawing Sheets

USER INTERFACE SYSTEM AND METHOD FOR JUMP ASSIST OF HYBRID VEHICLES

FIELD OF THE INVENTION

The present disclosure relates generally to user interfaces such as, for example, those that are used in hybrid automotive vehicles, and more specifically, to a user interface operable for displaying hybrid system information including high voltage battery diagnostics of a hybrid automotive vehicle while the vehicle is in various ignition modes and while providing access to other vehicles functions.

BACKGROUND OF THE INVENTION

Rechargeable energy storage devices are utilized in hybrid vehicles that are powered by both petroleum-based and electrical-based propulsion systems. These rechargeable energy storage devices include high voltage batteries. When a high voltage battery is unable to provide sufficient power to start a vehicle, the battery must be recharged. In order to recharge the battery, conventional systems and methods require that the system be off and access to other vehicle functions be restricted. This, in turn, presents various inconveniences to a user of the vehicle. By way of example, the user is without the ability to track the status of the charging. By way of another example, the user is without the ability to utilize other vehicle features such as, but not limited to, the radio, heated seats, air conditioning, navigational systems, etc. while the battery is being recharged.

In addition, when the need arises to recharge such a high voltage battery, known systems and methods for recharging are cumbersome. Known systems require the use and integration of some external interface device, such as a laptop computer, during the battery charging. Usually an external laptop, or like device, and a power supply are required in which the power supply is set at a peak voltage well below the peak voltage of the battery pack. Therefore, a need still exists in the art for such a system and method as the one described herein.

BRIEF SUMMARY OF THE INVENTION

In various exemplary embodiments, the present invention described herein provides a user interface system and method for visually displaying certain battery diagnostics, including, but not limited to, the battery charging status, of a high-voltage battery of the type used in hybrid automotive vehicles. Additionally, in various exemplary embodiments, the present invention provides a user interface system and method for performing and analyzing the charging function of a high voltage battery of a hybrid automotive vehicle in various ignition modes. In various other exemplary embodiments, a user interface system and method for permitting a user access to a vehicle's devices and features such as, for example, a radio, an air conditioner, heated seats, etc. during the charging function of a high voltage battery is provided. Other comparable uses are also contemplated herein, as will be obvious to those of ordinary skill in the art.

In exemplary embodiments, the present invention provides a user interface system and method for visually displaying hybrid vehicle information including battery diagnostics such as the charging status of a high voltage battery which is being charged to a desired state of charge. The user interface system may generally include a visual interface display device located internal the vehicle's cabin, the visual display device being operable for displaying the hybrid system information such as high voltage battery diagnostics to the user. In exemplary embodiments, the interface device is electronically connected to the vehicle's carrier sub-system which is, in turn, electronically connected to the vehicle's hybrid sub-system, each sub-system being comprised of a plurality of operating modules connected by a plurality of communication buses.

In exemplary embodiments, the carrier sub-system generally includes a user control interface module being communicably and electronically connected to a Front Control Module (FCM). The FCM is communicably and electronically connected to a Power-train Control Module (PCM) and a Hybrid Gateway Module (HGM). The PCM is, in turn, communicably and electronically connected to a cooling pump which is operable for cooling defined features of the vehicle, including features of the hybrid sub-system, during the charging function of the battery. The carrier sub-system is connected to the hybrid sub-system via communication buses electronically connected to the PCM and the HGM.

In exemplary embodiments, the hybrid sub-system generally includes a Battery Pack Control Module (BPCM) for controlling a high voltage battery which is operable for connection to a high voltage energy source, the high voltage energy source being configured to electrically attach to the high voltage battery such that access to a plurality of battery diagnostics may be provided. The BPCM may be communicably and electronically connected to a Hybrid Control Processor (HCP) and an Accessory Power Module (APM).

In exemplary embodiments, the interface system may be coupled to an internal high voltage energy source such as a battery, the battery being located in the hybrid vehicle to charge the high voltage battery to a desired state of charge and start the vehicle. In other exemplary embodiments, the interface system may be coupled to a high voltage energy source such as a battery connected to a jumper cable.

In exemplary embodiments, the user interface device is internal to the vehicle's cabin. Preferably, the interface device is located in the vehicle's dashboard console such that the user can readily view the displays being projected. The interface device generally includes a display screen for displaying various types of information and, in addition to serving other functions, is configured to provide a user with battery diagnostic data and state of charge data. The data is displayed to the user prior, during, and after battery charging. Optionally, the user interface further includes a touch pad and an audible system, wherein the audible system informs a user of a critical battery status.

In exemplary embodiments, the present invention provides a user interface system and method of providing a vehicle jump start visual assist to the user when the high voltage battery of a hybrid vehicle is in need of charging. The present invention also provides a method for determining the state of charge of a hybrid vehicle's battery and, if necessary, initiating a charging function which includes displaying diagnostic battery data of the battery to a user through the use of a visual display. The method of the present invention allows the charging function to operate in various ignition modes and permits the user to access defined vehicle features during the charging function of the battery. The method generally includes the steps of having a user attempt to start the vehicle unsuccessfully by positioning a key to a predetermined ignition mode. Thereafter, the vehicle's control processor determines the state of charge of the battery. If the state of charge is insufficient or below a predetermined level, a user interface device located internal the vehicle's cabin visually displays a message to the user indicating that charging is required. The user is then provided with a predetermined time unit to position the key to an appropriate ignition mode (e.g., Off, Unlock, or Run) and to connect a high voltage energy source, such as a jump cable, to the battery such that the battery can be appropriately charged. During this step, the vehicle's controller maintains the cooling pump in an active state in order to provide cooling to selected vehicle functions. Also during this step, the user is continually updated to the charging status of the battery via the visual display. After it is determined that the battery has been charged to a sufficient state of charge, a message is displayed to the user that charging is complete. At this time, the charging function is terminated and the user may successfully start the vehicle.

On a high level, the method includes the steps of having a user first gain access to the vehicle and attempting to start the vehicle by turning a key to a desired ignition mode. Thereafter, the system Hybrid Control Processor/Traction Power Inverter Module HCP(TPIM), which is initially set to an "Inactive" level, becomes active. If the vehicle fails to start, the HCP(TPIM) determines if the failure was due to a low state of charge of the battery. If the failure was due to a low state of charge, the HCP(TPIM) activates the jump assist operation of the vehicle. Further, the HCP(TPIM) generates a signal and communicates to the operating modules of the vehicle that the jump assist operation is required. The user is provided with a predetermined time period within which to meet a certain condition in order to have the jump assist operation continue. In exemplary embodiments, the condition may be to set the ignition to a valid calibration position. In other exemplary embodiments, the condition may be to connect the battery to an external energy source to charge the battery to the predetermined state of charge. If the HCP(TPIM) determines that the condition is met in the allotted time, a charging function is initiated to charge the battery to a predetermined state of charge. Further, the HCP(TPIM) generates a signal to the operating modules that the jump assist operation is active. This predefined state of charge is determined by the HCP via the BPCM. If, however, the HCP (TPIM) determines that the condition is not met, the charging function is terminated and the HCP(TPIM) generates a signal to the operating modules that the jump assist operation has been aborted. Thereafter, the jump assist operation is set to inactive and exited. If the HCP(TPIM) determines that both the condition is met and the predefined state of charge is met, then the charging function is complete and the operating modules are communicated to with a complete message. Thereafter, the charging function terminates and jump assist operation is set to inactive. The jump assist operation is exited and the vehicle may be started.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

The present disclosure is illustrated and described herein with reference to the various drawings, in which like reference numbers denote like system components and/or method steps, respectively, and in which.

DETAILED DESCRIPTION OF THE INVENTION

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

In various exemplary embodiments, the present invention provides a user interface system and method operable for use with a hybrid vehicle jump start assist and/or charging function. In all exemplary embodiments, the present invention provides a user interface system and method operable for visually displaying certain battery diagnostics, including, but not limited to, the battery charging status, of a high-voltage battery of the type used in hybrid automotive vehicles. Additionally, in exemplary embodiments, the user interface system and method is operable for performing and analyzing the charging function of a high voltage battery of a hybrid automotive vehicle in various ignition modes. In various other exemplary embodiments, the user interface system and method is operable for permitting a user access to a vehicle's devices and features such as, for example, a radio, an air conditioner, heated seats, etc. during the charging function of a high voltage battery. It will be understood by those skilled in the art that the user interface system is operable for having at least one operating module connected to a high voltage energy source to monitor the charging the vehicle's battery from a low state of charge ("SOC") to an acceptable, predefined level. In all exemplary embodiments, in order to inform the user that the jump assist/charging function is taking place, a visual jump assist feature (e.g., an interface device) is provided internal the vehicle's cabin.

In various exemplary embodiments, the system and method is provided for charging a high voltage battery of a hybrid automotive vehicle through the use of the user interface device located internal the vehicle's cabin. In exemplary embodiments, the user interface device is operable for providing a visual display of diagnostic hybrid system information, including but not limited to, battery data and state of charge data. In other exemplary embodiments, the present invention provides a user interface operable for providing a visual display of diagnostic hybrid system information, including but not limited to, battery data and state of charge data while also providing access to other features of the vehicle to the user.

Figure 1:
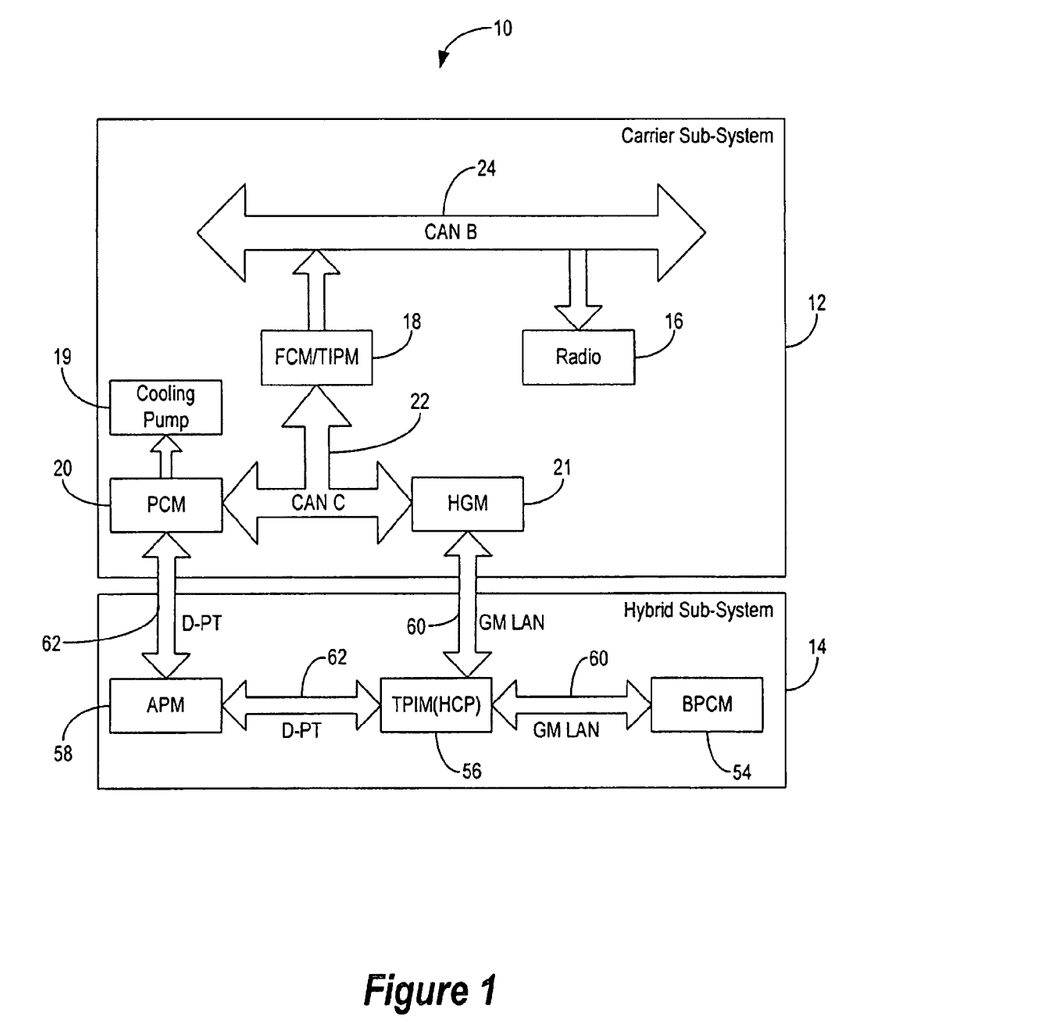
FIG. 1 is a system diagram of the user interface for jump assist of hybrid vehicles constructed in accordance with an exemplary embodiment of the present invention.

Referring now to the Figures and particularly FIG. 1, a user interface system constructed in accordance with an exemplary embodiment of the presented invention and being operable for use with a jump assist/charging function of a hybrid vehicle is illustrated. As illustrated, the system 10 includes a carrier sub-system 12 communicably and electronically connected to a hybrid sub-system 14, each being comprised of a plurality of operating modules connected by a plurality of communication buses. The carrier sub-system 12 generally includes a visual jump assist feature or user control interface device (e.g., navigational/radio unit) 16 contained within the vehicle's cabin and being communicably connected to a plurality of operating modules. Specifically, the interface device 16 is communicably connected to a Front Control Module (FCM)/Totally Integrated Power Module (TIPM) 18 by a CAN B type communication bus 24, which is, in turn, connected to a engine controller/Power-train Control Module (PCM) 20 and a Hybrid Gateway Module (HGM) 21 by a CAN C type communication bus 22. In exemplary embodiments, the FCM/TIPM 18 the acts as a gateway module between the CAN C 22 and CAN B 24 communication buses and assists in the vehicle's communication between operating modules. Further, the FCM/TIPM 18 is provided with controls over defined features of the vehicle. Still further, in exemplary embodiments, the TIPM may be provided with at least one integrated fuse for at least one module of the vehicle. The engine controller (PCM) 18 is connected to a cooling pump 19 and throughout this disclosure will be understood to remain operable as long as the jump assist operation is not terminated. The PCM 18 is operable for sending messages along the buses 22 and 24 which actuate the cooling pump 19 and a vehicle fan (not shown). In exemplary embodiments, the CAN C bus 22 has a speed of 125 kbps and may be referred to as an interior high speed bus. Further, the CAN B bus 24 may be provided with a speed of 500 kbps for more critical messages relating to the operation of the engine and transmission. However, it will be understood by those skilled in the art that the speeds of the communication buses may vary as needed and as technology evolves.

In other exemplary embodiments, the HGM 21 serves as a gateway module between the hybrid subsystem 14 (which is mainly the shared components) and the carrier sub-system 12. The HGM 21 is operable to translate information coming from the hybrid sub-system 14 side to the carrier sub-system 12 side and vice versa. The HGM 21 also serves to control some of the hardware components of the vehicle.

Figure 3:
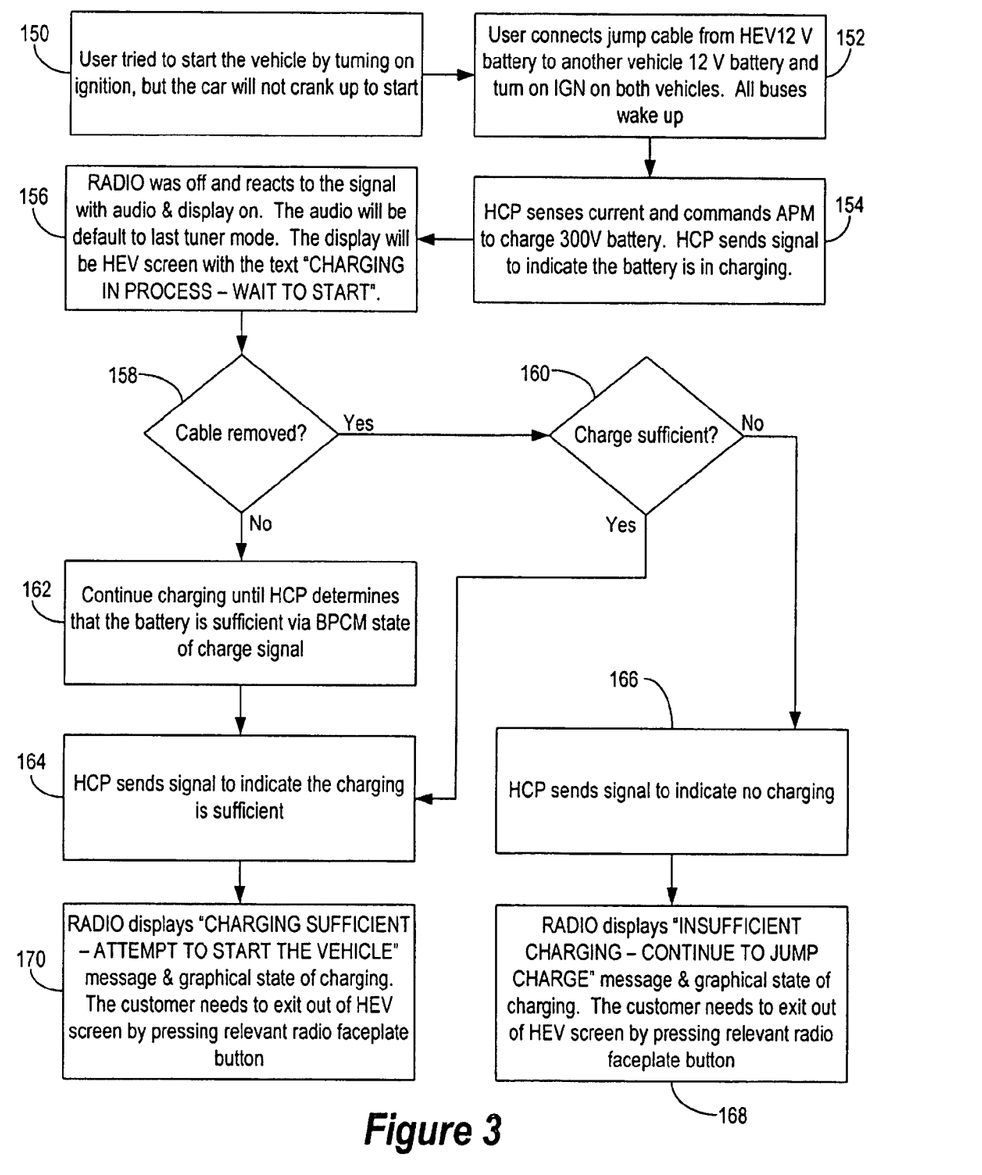
FIG. 3 is a flow diagram of a method illustrated in accordance with an exemplary embodiment of the present invention.
Figure 4:
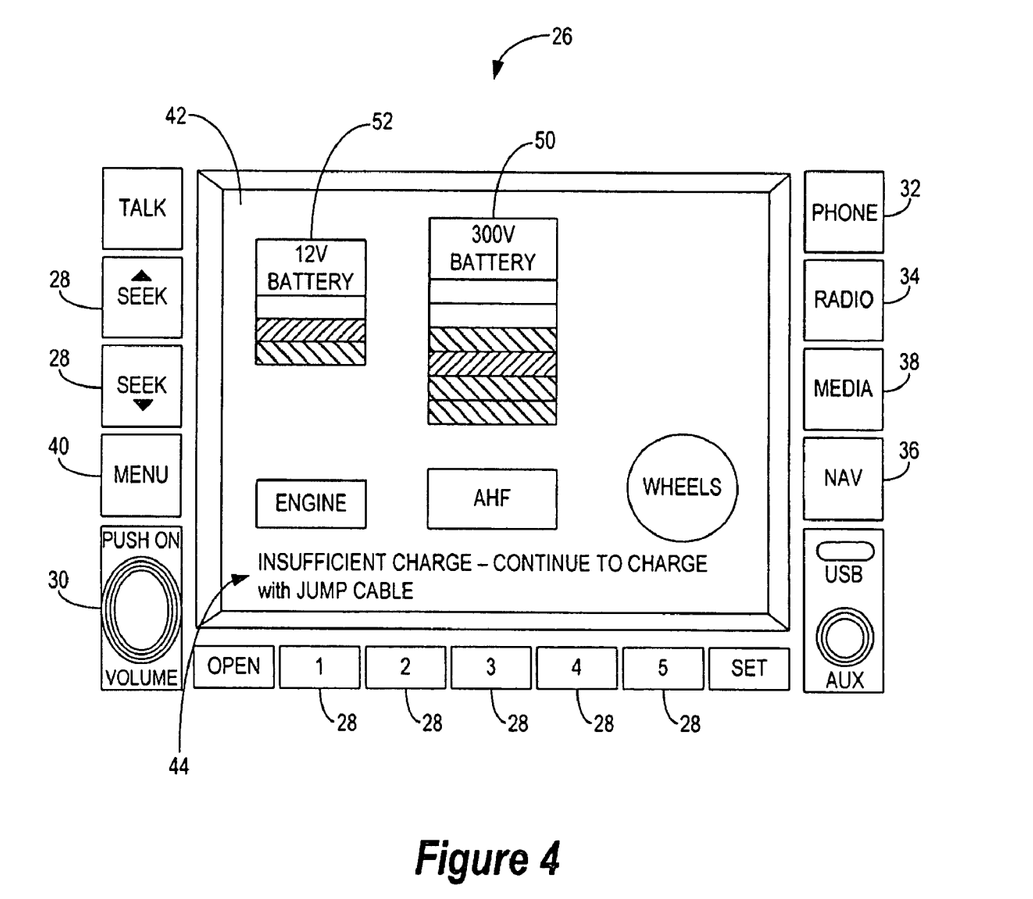
FIG. 4 is a schematic of a visual display containing a message of "Insufficient Charge—Continue to Charge with Jump Cable" produced by a radio/navigational unit internal a hybrid vehicle's cabin and produced in accordance with the system and method of FIGS. 1-3.
Figure 5:
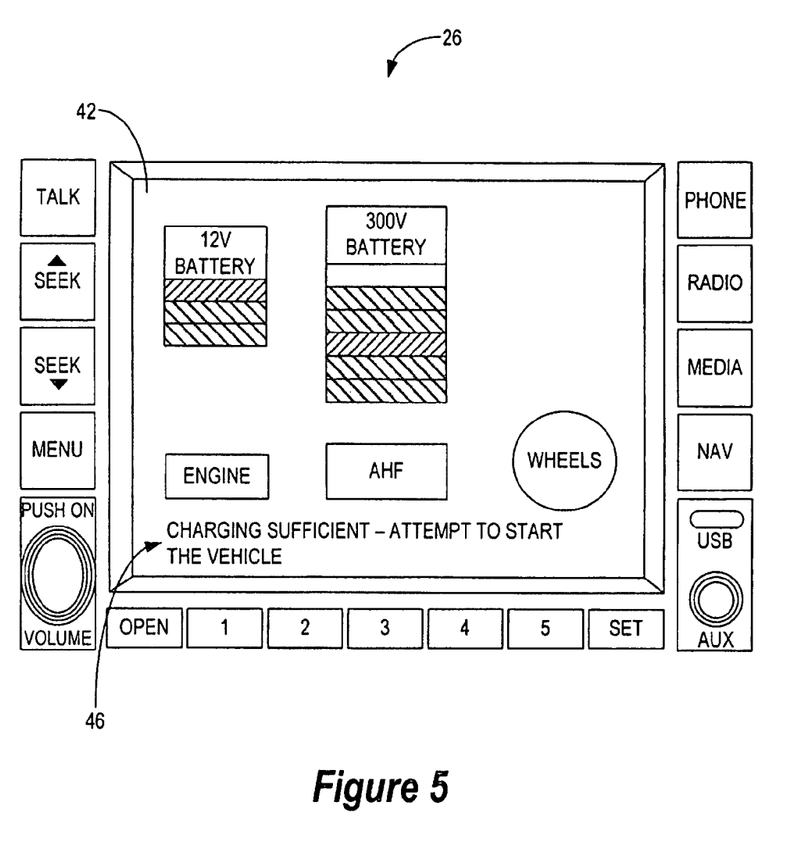
FIG. 5 is a schematic of a visual display containing a message of "Charging Sufficient—Attempt to Start the Vehicle" produced by a radio/navigational unit internal a hybrid vehicle's cabin and produced in accordance with the system and method of FIGS. 1-3.

In exemplary embodiments and as mentioned above, the user interface device 16 is located internal the vehicle and is operable for displaying hybrid system information. In exemplary embodiments, the information which is displayed to the user consists of three bit cyclic signals with a rate of 100 ms on a communication bus and a cyclic signal with a rate of 1000 ms on a high speed communication bus. Therefore, the FCM/TIPM 18 gateway module between the communication bus and the high speed bus receives multiple signals from the control processor on the communication bus before the same signal is transmitted on the high speed bus. The gateway module shall use the latest signal value to send to the schedule signal to a control module on the high speed bus. The display is shown on a display screen 42 of the vehicle's radio/navigational unit 26 (FIGS. 3-5). As is known in the art, the vehicle's radio/navigational display unit 26 may be located in either the dashboard console of the vehicle or the center armrest. In addition, the radio/navigational unit 26 typically includes a plurality of input means or push buttons which control distinct vehicles functions, such as audio, climate settings, odometer settings, lighting, mobile phones, and the like. These push button controls are generally illustrated as radio channel control 28, volume control 30, phone controls 32, radio controls 34, navigational controls 36, media controls 38, a menu controls 40. It will be understood by those skilled in the art, that the radio/navigational unit may include a touch pad feature for allowing control of the same functions.

In exemplary embodiments, the vehicle's dashboard console (not shown) can also include the display unit 26. The display unit 26 may be comprised of a liquid crystal display (LCD) or the like. As is known in art, the display unit 26 can display navigational information, audio settings, trip information, vehicle information, and the like. Additionally, subject to adequate safety precautions, the display unit 26 can also display entertainment, such as movies or television through a digital video disc (DVD), wireless transmission, or the like, and Internet access, such as wireless-based Internet access. The display unit 26 can be a GPS navigational system operable to plan trips, locate destinations, and provide directions. Additionally, the display unit 26 can operate as a navigation system as well as providing other functions.

In exemplary embodiments, the display unit 26 may also provide a touch panel control pad (not shown) that is configured and operable for providing a single point of control for the display unit 26 and other vehicle functions. For example, the control pad can be utilized to provide user input to a navigation system which is displayed in the display unit. Additionally, the control pad can incorporate other controls, such as the controls. The control pad can provide a single control pad for various vehicle systems including navigation, audio, climate, trip settings, lighting, seat adjustment, mobile phones, and the like.

Figure 6:
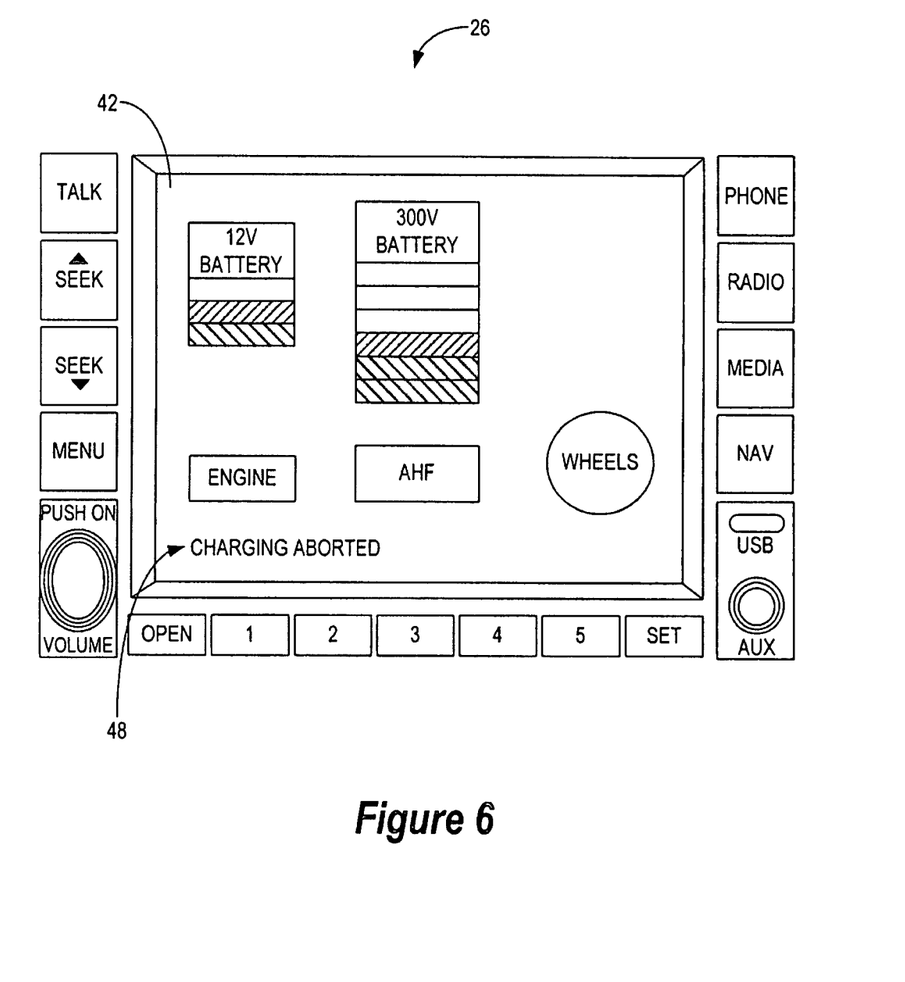
FIG. 6 is a schematic of a visual display containing a message of "Charging Aborted" produced by a radio/navigational unit internal a hybrid vehicle's cabin and produced in accordance with the system and method of FIGS. 1-3.

The hybrid system information which may be displayed on the display screen 42 includes the state of charge (SOC) for the high voltage battery 50 and various messages. Optionally, the display screen 42 may also include a visual display of the SOC for an external voltage source 52. As will be understood by those skilled in the art the term "state of charge" is typically defined to be the ratio of the remaining capacity of the battery to the fully charged capacity of the battery. However, for the purposes of this disclosure, the SOC is defined as the ratio of the amount or currently available capacity of the battery to the total available capacity. In other words, the SOC indicates the state of health (SOH) of the battery, which is generally defined as the ability to perform a specified task. The SOH of the battery reflects various factors of the battery, such as temperature change, high rate discharge efficiency, and decrease of battery capacity caused by deterioration of the battery. As illustrated, exemplary messages which may be displayed on the display screen 42 include "Insufficient Charge—Continue to Charge with Jump Cable" 44 (FIG. 4), "Charging Sufficient—Attempt to Start Vehicle" 46 (FIG. 5), and "Charging Aborted" 48 (FIG. 6). However, it will be understood by those skilled in the art that any messages may be displayed, in any language, which adequately display and convey the hybrid system information to the user.

The hybrid sub-system 14 generally includes a Battery Pack Control Module (BPCM) 54 for controlling a high voltage battery which is operable for connection to an external high voltage source, the external high voltage source being configured to electrically attach to the high voltage battery such that access to a plurality of battery diagnostics may be provided. In exemplary embodiments, the BPCM 54 is contained within a battery pack (BP) of the vehicle. The BCPM 54 is operable for monitoring battery pack voltages, battery pack temperatures, battery pack current, and controls battery pack charging. Further, in the exemplary embodiments illustrated, the BCPM 54 is communicably and electronically connected to a Traction Power Inverter Module/Hybrid Control Processor (TPIM/HCP) 56 and an Accessory Power Module (APM) 58 via a GM LAN communication bus 60 and a dedicated power train bus D-PT 62 communication bus. As is known in the art, the TPIM/HCP 56 is operable for controlling the whole power train, the speed, torque and direction of the e-motors (which is controlled by the MCPA—Motor Control processor A and B) and along with the engine controls (which is done by the HCP). The APM 58 is a bi-directional DC/DC converter, converting both 300 V to 12V power and also 12V to 300V power. The APM 58 has a maximum output power from 300V to 12V is 2200 W, or 175 A, whichever applies first.

Figure 2:
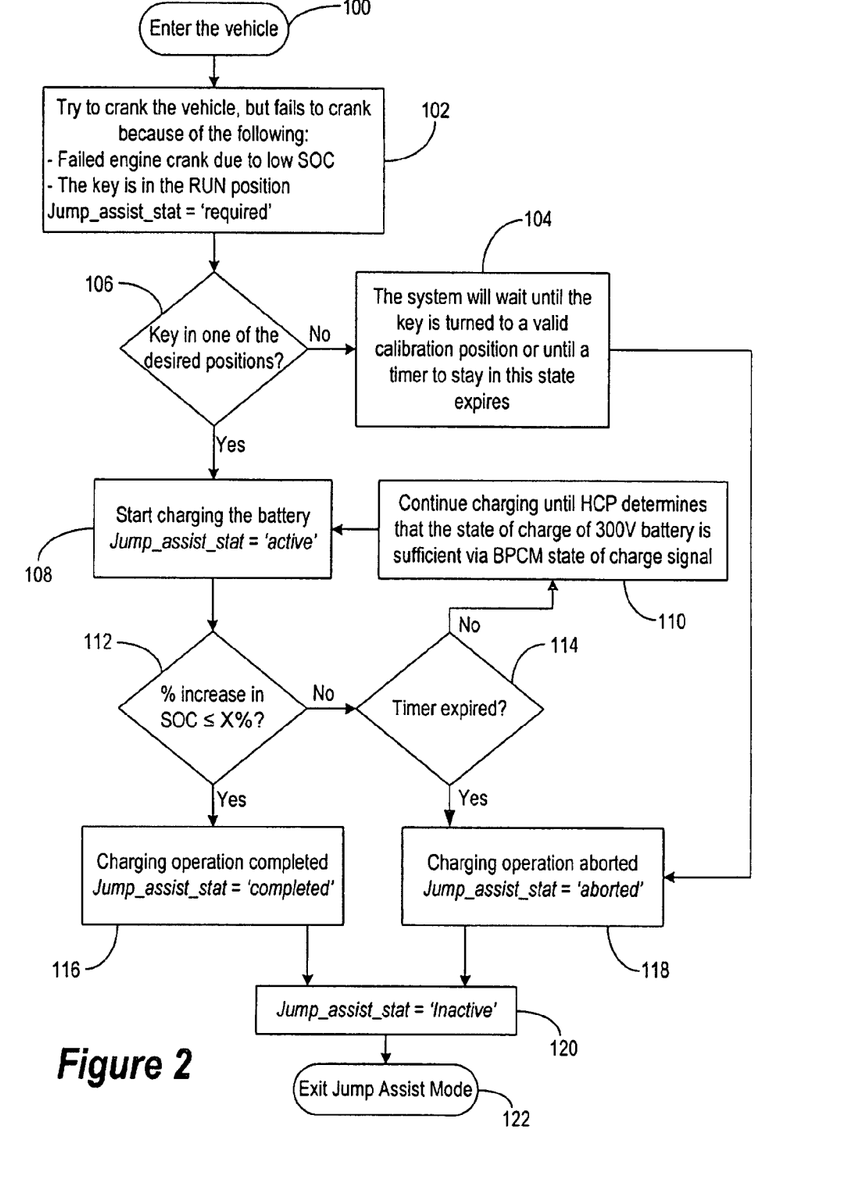
FIG. 2 is a flow diagram of a method illustrated in accordance with an exemplary embodiment of the present invention.

Referring now to FIG. 2, a high level flow diagram of a method constructed in accordance to one exemplary embodiment of the presented invention is illustrated. In the method, the jump assist operation and/or charging function may be initiated in one of two ways. First, the user can crank the engine and it could fail due to a low SOC. Second, the user can force the jump charge by connecting an external device such as a service tool. The present method also includes various flags and timers under which the charging function will initiate, abort or terminate. These flags and timers may include a predefined, acceptable SOC of the vehicle's high voltage battery, a predefined time unit within which a user may connect jumper cable or external energy source to the battery for charging and/or a predefined ignition mode or position under which the charging function will initiate. As illustrated, the method generally includes the steps of first having a user enter the vehicle (Step 100) and turning a key to a desired ignition mode. While the door of the vehicle is still ajar, the system HGM sends out an output pulse of approximately 60 ms to wake up/activate certain operating modules such as the HCP and the BCPM. In the event that no further action is taken after the door is opened and the key is inserted into the ignition, the jump assist or charging function will not be enabled and the modules will be set to inactive. If however, the user attempts to crank the vehicle (Step 102) by turning the key to a RUN calibration position, the vehicle will attempt to start. At this step, if the vehicle fails to crank, the control processor (HCP) must determine SOC. The SOC is processed by the system BCPM and communicated to the HCP. If the HCP determines that the SOC is low or insufficient based upon predefined levels and if the key is in a RUN ignition mode, the HCP generates and communicates a signal to the operating modules that a jump assist operation is "required." Next, the HCP determines if the key is in one of a desired and acceptable position (Step 106). If the key is in an acceptable or valid calibration position (e.g., Off, Unlock, or Run), the charging function of the battery begins and the jump assist operation is initiated (Step 108). At this step, the HCP generates and communicates a signal to the operating modules that the jump assist operation is "active." If however, the key is not is an acceptable ignition mode, then the system will wait until the key is turned to a valid calibration position or until a predefined time unit expires (Step 104). If the key is not turned to a valid position within a predefined time unit the charging function is aborted and the HCP generates a signal and communicates to the operating modules that the charging function is "aborted" (Step 118). Then, the HCP sets and signals the operating modules that the jump assist operation is "inactive" (Step 120). Thereafter, the jump assist operation is exited (Step 122).

Once the charging function initiated at Step 108, the HCP periodically monitors and determines if there is an appropriate percent increase in the SOC (Step 112). This percent increase is determined by comparing the SOC to a predefined value. In exemplary embodiments, the predefined value is 5%, such that to calculate if the charging function is complete the percent increase in the SOC must be less than or equal to ($\leqq$) 5%. If there is not an appropriate percent increase within a predefined time unit (Step 114), the charging function continues until a predefined SOC is achieved (Step 110). Once the HCP determines that the percent increase is greater than (>) the predefined value, in exemplary embodiments 5%, the charging function is completed (Step 116) and then set to inactive. At this step the HCP generates a signal and communicates to the operating modules that the jump assist is "completed." Then, the HCP sets and signals the operating modules that the jump assist operation is "inactive" (Step 120). Thereafter, the charging function is exited (Step 122) and the vehicle may be started.

Referring now to FIG. 3, a low level flow diagram of an exemplary embodiment of the method of the present is shown. The invention provides a method for determining the state of charge of a hybrid vehicle's battery and, if necessary, initiating a charging function which includes displaying diagnostic battery data of the battery to a user through the use of a visual display. The method of the present invention allows the charging function to operate in various ignition modes and permits the user to access defined vehicle features during the charging function of the battery. The method includes the steps of having a user first gain access to the vehicle and attempting to start the vehicle by turning a key to a desired ignition mode. If, after the user tries to start the vehicle by turning the key to an appropriate ignition mode, the vehicle fails to crank up to a start (Step 150), the HCP determines if the failure is due to a low SOC of the battery.

If the failure is due to a low SOC, the user is informed that there exists an insufficient charge (FIG. 4) by having the system HCP generate a message for display on the system interface device. Further, the user is provided with a predetermined time period within which to meet a certain condition in order to have the jump assist operation begin. In exemplary embodiments, the condition may be to set the ignition to a valid calibration position and to connect the battery to a high voltage energy source to charge the battery to the predefined SOC. The user then connects the high voltage energy source (e.g., an internal battery or a jumper cable connected to an external battery) to the vehicle and turns the ignitions on to both the vehicle and the high voltage energy source (Step 152). At this step, all communication busses and certain operating modules activate such that the charging function can initiate. Thereafter, the HCP signals the system APM to begin charging the battery (Step 154). The interface device then informs the user that charging is in process and to wait to attempt to start the vehicle (Step 156).

After a predefined time, the HCP determines if the high voltage energy source has been removed (Step 158). If the high voltage energy source has been removed, the HCP determines if the SOC is sufficient (Step 160). If the SOC is sufficient, the HCP sends a signal to the operating modules (Step 164) and displays a message to the user that the battery charge is sufficient and to attempt to start the vehicle (Step 170) and (FIG. 5). If, however, the SOC is insufficient, the system HCP sends a signal that no charging has occurred (Step 166). Thereafter, the user is notified that the charging was insufficient and that continued charging is required (Step 168). Alternatively, the user is informed that the charging was aborted (FIG. 6).

If the high voltage energy source has not been removed, then the HCP continues the charging of the battery (Step 162) until a predefined SOC is reached. As mentioned above, the predefined SOC is determined by the HCP via the BPCM. If, after a predefined time, the HCP determines that the charging is still insufficient, a message is displayed on the interface device which alerts the user that the charging has been aborted (FIG. 6). Thereafter, the charging function is aborted and the jump assist operation is set to inactive. If the HCP determines that the SOC is sufficient, the HCP sends a signal to the operating modules (Step 164) and displays a message to the user that the battery charge is sufficient and to attempt to start the vehicle (Step 170) and (FIG. 5).

In exemplary embodiments of the present invention, during the charging function of the battery, the vehicle's HCP activates and maintains the cooling pump in an active state in order to provide cooling selected vehicle functions. Specifically, the cooling pump is maintained in a low cooling state and meets the requirements of the APM. This, in turn permits the user access to the vehicle features such as the radio, the air conditioning system, heated seats, etc. Also during the charging function, the user is continually updated to the charging status of the battery via a visual display on the interface device. Advantageously, this results in an improved user convenience system.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A method for charging a high voltage battery of a hybrid automotive vehicle and displaying battery defined diagnostic data to a user, comprising the steps of:
    providing a plurality of operating modules operable for charging the high voltage battery and displaying battery diagnostic data to the user, said plurality of operating modules comprising a carrier sub-system electronically connected to a hybrid sub-system;
    initiating a jump assist operation upon an attempt to start the vehicle;
    determining whether the state of charge of the high voltage battery is greater than a defined minimum value, if the vehicle fails to start;
    notifying the user that a charging function is required by displaying a message on an interface device;
    initiating a charging function to charge the high voltage battery to a state of charge greater than the defined minimum value, if the state of charge is determined to be insufficient;
    determining if the high voltage battery has been sufficiently charged;
    notifying the user that the charging function is complete, if the state of charge is greater than the defined minimum value; and
    terminating the jump assist operation,
    wherein the state of charge is a ratio of the remaining capacity of the high voltage battery to the capacity of the high voltage battery in its fully charged state.

2. The method of claim 1, further comprising the steps of requiring the user to insert a key into the vehicle's ignition and turning the key to a valid calibration position prior to determining the state of charge of the high voltage battery.

3. The method of claim 1, further comprising the step of periodically updating to the charging status of the high voltage battery by visually displaying charging status messages on the interface device, if the charging function is initiated.

4. The method of claim 1, further comprising the step of providing access to the user to vehicle devices and features during the charging function.

5. The method of claim 1, further comprising the step of requiring the user to connect an external energy source to the high voltage battery, if the state of charge is not greater than the defined minimum value.

6. The method of claim 5, further comprising the step of requiring the user to connect the external energy source to the high voltage battery in a defined time.

7. The method of claim 5, further comprising the step of aborting the charging function, if the external energy source is disconnected prior to the state of charge defined minimum value being reached.

8. The method of claim 7, further comprising the step of displaying a message to the user that the charging function was aborted.

9. The method of claim 8, further comprising the step of aborting the charging function, if the external energy source is not connected in the defined time.

10. The method of claim 9, further comprising the step of displaying a message to the user that the charging function was aborted.

11. The method of claim 4, wherein the vehicle devices and features are selected from the group consisting of an audio system, an air conditioning system, a heating system, a navigational system or a telephone system.

12. A user interface system for charging a high voltage battery of a hybrid vehicle and displaying hybrid system information to a user, comprising:
    a carrier sub-system, said carrier sub-system comprising a plurality of operation modules including a user control interface module communicably and electronically connected to a front control module (FCM), the FCM being communicably and electronically connected to a powertrain control module (PCM), and a hybrid gateway module (HGM);
    a hybrid sub-system, said hybrid sub-system comprising a plurality of operation modules including a battery pack control module (BPCM) for controlling a high voltage battery, the BPCM being communicably and electronically connected to a hybrid control processor (HCP) and an accessory power module (APM); and
    a user interface device located internal the vehicle's cabin and being communicably and electronically connected to the FCM,
    wherein the plurality of operation modules of the carrier sub-system and the hybrid sub-system are connected by a plurality of communication buses.

13. The system of claim 12, wherein the PCM is communicably and electronically connected to a cooling pump operable for cooling defined features and devices of the vehicle, including features of the hybrid sub-system, during the charging function of the battery.

14. The system of claim 12, wherein the BPCM may be coupled to an internal charging source, the internal charging source being located in the hybrid vehicle to charge the high voltage battery to a desired state of charge and start the vehicle or to an external charging source.

15. The system of claim 14, wherein the external charging source is a battery connected to a jumper cable.

16. The system of claim 12, wherein the user interface device is located in the vehicle's dashboard console such that the user can readily view the displays being projected.

17. The system of claim 12, wherein the user interface device comprises a display screen for displaying various types of hybrid system in addition to serving other functions.

18. The system of claim 12, wherein the user interface device comprises a touch pad and an audible system, wherein the audible system is operable for informing a user of a critical battery diagnostic data in addition to broadcasting music and other information.

19. The system of claim 17, wherein the display screen is operable for displaying battery diagnostic data and state of charge data.

20. A method for charging a high voltage battery of a hybrid automotive vehicle and displaying battery defined diagnostic data to a user, comprising the steps of:

providing a plurality of operating modules operable for charging the high voltage battery and displaying battery diagnostic data to the user, said plurality of operating modules comprising a carrier sub-system electronically connected to a hybrid sub-system;

initiating a jump assist operation upon an attempt to start the vehicle; requiring the user to insert a key into the vehicle's ignition and turning the key to a valid calibration position;

determining whether the state of charge of the high voltage battery is greater than a defined minimum value, if the vehicle fails to start; notifying the user that a charging function is required by displaying a message on a interface device;

requiring the user to connect to the high voltage battery an external energy source within a defined time, the external energy source being operable for charging the high voltage battery;

initiating a charging function to charge the high voltage battery to a state of charge greater than the defined minimum value, if the state of charge is determined to be insufficient;

periodically determining if the high voltage battery has been sufficiently charged and updating to the charging status of the high voltage battery by visually displaying charging status messages on the interface device, if the charging function is initiated;

aborting the charging function if the external energy source becomes disconnected or if the state of charge is not reached in a defined time;

notifying the user that the charging function was not complete, if the charging function is aborted;

providing access to the user to vehicle devices and features during the charging function;

notifying the user that the charging function is complete, if the state of charge is greater than the defined minimum value; and terminating the jump assist operation.

* * * * *